(12) United States Patent
Thyagarajan et al.

(10) Patent No.: US 7,721,277 B1
(45) Date of Patent: May 18, 2010

(54) HOT DEPLOYMENT OF SHARED MODULES IN AN APPLICATION SERVER

(75) Inventors: Sivakumar Melapannai Thyagarajan, Tamil Nadu (IN); Binod Pankajakshy Gangadharan, Kerala (IN); Srikanth Padakandla, Bangalore (IN)

(73) Assignee: Oracle America, Inc., Redwood Shores, CA (US)

( * ) Notice: Subject to any disclaimer, the term of this patent is extended or adjusted under 35 U.S.C. 154(b) by 1557 days.

(21) Appl. No.: 10/863,086

(22) Filed: Jun. 8, 2004

(51) Int. Cl.
*G06F 9/44* (2006.01)
(52) U.S. Cl. .................. 717/166; 717/162; 717/163; 717/164; 717/165
(58) Field of Classification Search .............. 717/164, 717/166; 719/331, 332
See application file for complete search history.

(56) References Cited

U.S. PATENT DOCUMENTS

| | | | |
|---|---|---|---|
| 6,339,841 B1 | 1/2002 | Merrick et al. | |
| 6,430,569 B1* | 8/2002 | Bracha et al. ........... | 707/103 R |
| 6,470,494 B1 | 10/2002 | Chan et al. | |
| 6,571,388 B1 | 5/2003 | Venkatraman et al. | |
| 6,748,396 B2 | 6/2004 | Klicnik et al. | |
| 6,915,511 B2 | 7/2005 | Susarla et al. | |
| 7,039,923 B2 | 5/2006 | Kumar et al. | |
| 7,316,010 B1* | 1/2008 | Daynes et al. ............. | 717/140 |
| 2002/0147971 A1* | 10/2002 | Adams ...................... | 717/165 |
| 2003/0018950 A1* | 1/2003 | Sparks et al. ............. | 717/100 |
| 2003/0177484 A1* | 9/2003 | Bosschaert et al. ........ | 717/166 |
| 2003/0200350 A1* | 10/2003 | Kumar et al. ............. | 709/315 |
| 2004/0010631 A1* | 1/2004 | Potter et al. .............. | 709/250 |
| 2004/0015936 A1* | 1/2004 | Susarla et al. ............ | 717/166 |
| 2004/0255293 A1* | 12/2004 | Spotswood ............... | 717/176 |
| 2004/0255294 A1* | 12/2004 | Spotwood ................ | 717/176 |
| 2005/0060698 A1* | 3/2005 | Boykin et al. ............ | 717/166 |

OTHER PUBLICATIONS

Peterson, "Understanding J2EE Application Server Class Loading Architectures," May 2002.*
Liang et al., "Dynamic Class Loading in the Java™ Virtual Machine," 13th Annual ACM SIGPLAN Conference on Object-Oriented Programming Systems, Languages and Applications (OOPSLA '98) Oct. 1998, (9 pages).

(Continued)

*Primary Examiner*—Insun Kang
(74) *Attorney, Agent, or Firm*—Robert C Kowert; Meyertons, Hood, Kivlin, Kowert & Goetzel, P.C.

(57) ABSTRACT

System and method for the hot deployment of shared modules, for example standalone resource adaptor modules (RARs), in systems. A class loader mechanism may utilize, in a hierarchy of class loaders, a shared "delegator" class loader which delegates received load class requests to a chain of class loaders, each representing a hot-deployable module. Hot deployment of a module results in the redeployment of the associated class loader in the chain rather than in a single, shared class loader. In one embodiment, when a load class request is received, the delegator class loader traverses the chain to find the class loader to load the class indicated by the request, the request is delegated to the class loader, and the class loader loads the class. If the module and class loader are subsequently redeployed, the redeployed version of the class loader loads the new version of the class.

60 Claims, 8 Drawing Sheets

OTHER PUBLICATIONS

"Technical Articles and Tips—JDC Tech Tips: Oct. 31, 2000," http://java.sun.com/developer/TechTips/2000/tt1027.html, Oct. 31, 2000, (6 pages).

"Class ClassLoader," Java™ 2 Platform Std. Ed. V1.4.2, 2003, (18 pages).

David Marks, "J2EE Connector Architecture Brings Business Systems to the Web," http://java.sun.com/features/2000/08/connect.html, Apr. 29, 20004, (5 pages).

"Class java.lang.ClassLoad," Sun Microsystems, Inc., *Submit a bug or feature*—Version 1.1.8 of Java Platform API Specification, 1995-1999, 6 pages.

"iPlanet Application Server Overiew Guide", Chapters 2 & 4, Sun Microsystems, Inc., 2000, 14 pages.

"Programmer's Guide (Java), iPlanet Application Server," Release 6.0, Apr. 2000, pp. 289-291.

"Java Language Reference," O'Reilly, $2^{nd}$ Edition, Jul. 1997, 11 pages.

Gong, "Secure Java Class Loading," IEEE, Dec. 1998, (pp. 56-61).

"Java Dynamic Class Loader," vol. 39, No. 11, IBM Technical Disclosure Bulletin, Nov. 1996, (pp. 107-108).

* cited by examiner

HOT DEPLOYMENT OF SHARED MODULES IN AN APPLICATION SERVER

BACKGROUND OF THE INVENTION

1. Field of the Invention

This invention relates to computer software, and more particularly to the "hot" deployment of shared modules in computing systems.

2. Description of the Related Art

Enterprise component developers may require the ability to dynamically load new implementations of their components in distributed component-based systems such as Java™ 2 Enterprise Edition (J2EE™) application servers for reasons including one or more of, but not limited to:

Lower system downtime: Large enterprise deployments of business components need to stay "alive" and reduce downtime to provide better service to users of the system and still work with modified implementations of business components.

Faster development cycles: Developers would like to see changes to a component without restarting the application server. Hot deployment of self-contained components in a system such as a J2EE application server may help to accelerate development cycles.

Class Loaders

Class loaders are one of the cornerstones of virtual machine architectures such as the Java™ Virtual Machine (JVM™) architecture. A class loader is an object that is responsible for loading classes. Programmatically speaking, class loaders are ordinary objects that may be defined in code (e.g. Java™ code). In Java™ technology, class loaders are instances of subclasses of abstract class ClassLoader. Java, J2EE, and JVM, as used throughout this document, are trademarks or registered trademarks of Sun Microsystems, Inc. in the United States and other countries.

Given the name of a class, a class loader may attempt to locate or generate data that constitutes a definition for the class. A typical strategy is to transform the name into a file name and then read a "class file" of that name from a file system. The default class loading behavior in the JVM is to load the class file from a specified location (specified in a class path) into the memory and to execute the byte code as and when the request comes in for the particular class. Whenever a class refers to another class, for example, by initializing a field or local variable, the referent is immediately loaded (or delegated by that class loader to its parent class loader) by the same class loader that loaded the referencing class.

Class loaders may enable a system (e.g., a virtual machine) to load classes without knowing anything about the underlying file system semantics, and may allow applications to dynamically load classes such as Java™ classes as extension modules. Virtual machines such as JVM may provide a facility by which a user can introduce a custom class loader. In Java™ technology, applications may implement subclasses of ClassLoader in order to extend the manner in which the JVM dynamically loads classes. For example, in JVM, a hook is provided to the loading mechanism through the custom class loaders.

The Java™ class loading mechanism may provide the following features:

Lazy loading, or "laziness". In lazy loading, classes are loaded on demand. Class loading is delayed as long as possible, reducing memory usage and improving system response time.

Type-safe linkage. Dynamic class loading should not violate the type safety of the JVM, and should not require additional run-time checks in order to guarantee type safety. Additional link-time checks are acceptable, because these checks are performed only once.

User-definable class loading policy. In Java™, class loaders are first class objects, and programmers may control dynamic class loading. A user-defined class loader may, for example, specify the remote location from which the classes are loaded, or assign appropriate security attributes to classes loaded from a particular source.

Multiple namespaces. Class loaders may provide separate namespaces for different software components. For example, an application may load applets from different sources into separate class loaders. These applets may contain classes of the same name, but the classes are treated as distinct types by the JVM.

Delegation Model

Class loader mechanisms such as the Java™ ClassLoader class may use a delegation model to search for and load classes and resources. In the delegation model, each instance of a class loader has an associated parent class loader (with the exception of a highest class loader in a hierarchy). Note that, in the Java™ class loading model, a class loader can have one and only one parent class loader. In the delegation model, whenever a class loader receives a request to load a class, it consults or delegates to its parent class loader first.

A standard Java™ application begins with a delegation of three class loaders: the system class loader, the extension class loader, and the bootstrap class loader. The system class loader loads classes from the class path, and delegates to the extension class loader, which loads Java™ extensions. The parent of the extension class loader is the bootstrap class loader, also known as the null class loader. The bootstrap class loader loads the core API.

In the Java™ class loading model, the system class loader may serve as the parent of one or more ClassLoader instances, which may themselves be parents to one or more other class loaders. Thus, in a JVM, there may be a hierarchy, or tree, of class loaders. When requested to find a class or resource, a class loader instance in the hierarchy may delegate the search for the class or resource to its parent class loader before attempting to find the class or resource itself. In turn, the request may be passed to the parent class loader of the parent class loader, and so on up the hierarchy. If none of the parent class loaders can provide the class, the request is returned to the originating class loader, which may then attempt to load the class.

A class loader may cache a class once it loads the class and then service subsequent requests for the class from the cache. In Java™, to achieve temporal namespace consistency, the virtual machine maintains a "loaded class cache". The default ClassLoader.loadClass( ) implementation invokes a ClassLoader.findLoadedClass( ) that performs a lookup on this cache, before delegating the loading of a class to a parent class loader.

The delegation model may provide benefits including one or more of, but not limited to, the following. First, the delegation model protects the core API. Application-defined class loaders are not able to load new versions of the core API classes because they must eventually delegate to the bootstrap loader. This prevents the accidental or malicious loading of system classes that might corrupt or compromise the security of the virtual machine. Second, the delegation model makes it easy to place common classes in a shared location. For example, in a servlet engine the servlet API classes may be placed in the class path where they can be shared. The actual servlet implementations may be loaded by a separate URL class loader so that they can be reloaded later. Third, the delegation model makes it possible for objects loaded by different class loaders to refer to each other through superclasses or superinterfaces that are loaded by a shared class loader higher in the delegation.

Since the Java™ class loading model allows user-defined class loading policies, users can create their own class loaders; however, these class loaders should follow the delegation model.

Module Deployment

With the introduction of the delegation model in class loaders and the ability to load multiple classes with the same name (multiple communicating namespaces) into a virtual machine, component developers can partition their code as self-contained modules and 'hot-deploy' these modules. For example, the Java™ delegation class loading model used by J2EE may allow developers to hot-deploy self-contained modules.

Hot deployment of modules is typically supported for modules that are loaded by class loaders that are "leaves" in an application server's class loader hierarchy. In J2EE, for example, an EAR (J2EE enterprise archive) or WAR (J2EE web archive) are candidates for hot deployment in application servers as these applications are loaded by class loaders that are leaves in the application server class loader hierarchy. These applications are either self-contained or use classes that may be loaded by parent class loaders. There are no applications/components, dependent on these applications deployed in the application server instance. Hot deployment of such components may be achieved by re-creating the class loader instance that represented the corresponding EAR or WAR and the new definitions of the classes in the EAR/WAR may be lazily loaded when they are first referred to.

The J2EE Connector architecture provides a Java™ solution to the problem of connectivity between multiple application servers and enterprise information systems (EISs) using resource adapters. By using the J2EE Connector architecture, EIS vendors no longer need to customize their product for each application server. Application server vendors that conform to the J2EE Connector architecture do not need to write custom code to add connectivity to a new EIS.

As an example of modules that may be hot deployed, within the J2EE Connector architecture, support for deployment of standalone RARs (Resource adapter modules) is mandated. The standalone deployment of a resource adapter is typically performed to support scenarios where the resource adapter is provided as a standalone module. The J2EE Connector architecture allows standalone RARs to be shared by multiple J2EE applications. This allows multiple J2EE applications deployed in an application server instance to share a single resource adapter module.

Since a standalone resource adapter and its classes may be used by multiple applications deployed in an application server instance, the standalone resource adapter(s) needs to be realized via a class loader that is placed higher in the class loader hierarchy and serving as a parent class loader to all deployed J2EE applications. A single class loader is typically employed in application server implementations to realize all standalone resource adapters, and this class loader either is a direct parent of all deployed applications in the application server instance or lies in the path from a deployed application to the root class loader.

Module developers including resource adapter developers may require the application server to provide the capability to hot-deploy modules such as shared standalone resource adapter modules (RARs). The hot deployment of modules such as RARs may present problems including one or more of, but not limited to:

The hot deployment cannot be performed in a manner similar to the hot deployment of "leaf" applications because the single class loader, that realizes all standalone resource adapters, is shared by multiple applications deployed in the application server instance.

The idea of removing the entries in the single class loader that realizes all standalone resource adapters corresponding to the classes of the resource adapter that is about to be redeployed will not work, because the loaded classes cache, described earlier, maintained by the virtual machine for each class loader, will return the old cached implementation of the class that has been redeployed.

Thus, the hot deployment of such standalone modules may present problems as a shared class loader is typically employed by application servers to realize the standalone modules, and it may be difficult to recreate (redeploy) the class loader instance due to the use of a shared class loader.

FIG. 1 illustrates a portion of an exemplary class loader hierarchy including a shared class loader. In this example, the shared class loader (main class loader 104) may have a parent class loader 102 between it and the system class loader 100 (note that there may be no, or more than one, levels of class loaders between main class loader 104 and system class loader 100 in the hierarchy). Main class loader 104 may have two or more child class loaders 108. Child class loaders 108 may be associated with one or more applications; thus, main class loader 104 may be shared by two or more applications. Also, note that there may be one or more levels of class loaders below a child class loader 108.

As described above, main class loader 104 may cache loaded classes to a loaded class cache 106. Note that, while FIG. 1 shows the loaded class cache 106 within the main class loader 104, the loaded class cache 106 may be implemented external to the main class loader 104. Subsequent requests for a class to the main class loader 104 may lookup the class in the loaded class cache 106. Thus, if the class is redeployed, subsequent requests for the class that are handled by the main class loader 104 may return a cached version of the class from loaded class cache 106 rather than the redeployed version of the class. In addition, the main class loader 104 cannot itself be redeployed to solve the problem because the main class loader may be shared by two or more applications. To cause the correct version of the redeployed class to be accessed, the entire application server may need to be stopped and restarted.

In the J2EE Connector architecture, main class loader 104 is a main connector class loader that is the class loader for all RARs. The main connector class loader a URL class loader that loads URLs of all the RARs. It may be necessary or desirable to redeploy a RAR (undeploy a current version and deploy a different version) to work with the different version of the RAR, for example during a development cycle. When a RAR is undeployed, its URL is removed from the URL connector class loader. However, as mentioned, class loaders have a loaded class cache which serves to maintain temporal consistency. When a class is loaded by the class loader, the class is cached to the loaded class cache. When a request for a previously resolved class is received by the class loader, the loaded class cache is accessed to service that request. After a RAR is undeployed, the loaded class cache returns the previously resolved class to service load class requests. Thus, even if a RAR is redeployed, the older classes are still returned unless the entire application server is stopped and restarted.

The above information on class loaders generally refers to the Java™ programming language and to the Java™ Virtual Machine (JVM) architecture as an example of an implementation of class loaders. This information, however, may be relevant to other architectures, programming languages, environments including virtual machine environments, platforms, applications, application servers and/or implementations of class loaders.

SUMMARY

Embodiments of a system and method for the hot deployment of shared modules in systems including application servers are described. Embodiments may provide a class loader mechanism for hot deployment of modules such as standalone resource adaptor modules (RARs). The class loader mechanism may utilize, in a hierarchy of class loaders, a shared "delegator" class loader which delegates the loading of classes to a list or "chain" of redeployable individual class loaders, each representing a module, which may be referred to as "module class loaders." Using embodiments of the class loader mechanism, hot deployment of modules results in the redeployment of the associated individual class loaders in the chain rather than in a single, shared class loader.

In embodiments, the delegator class loader maintains a chain of "deployed" module class loaders. The class loaders in the chain are independent class loaders that are configured to load the classes of deployed modules. In one embodiment, when a module is deployed, its associated class loader is added to the "end" of the chain. If and when the module is undeployed, its associated class loader is removed from the chain. When a different version of the module is redeployed, a new class loader for the module is added to the chain. In one embodiment, the module class loaders in the chain may be deployed as child class loaders of the same parent class loader as the delegator class loader.

In one embodiment, when a request for a class is received from a child class loader, the delegator class loader traverses the chain to find the module class loader to load the class. In one embodiment, traversal of the chain may be performed sequentially, from the oldest class loader in the chain to the newest. In one embodiment, the delegator class loader may first delegate the load class request to its parent class loader, and thus may only attempt to delegate the load class request to the chain of class loaders if the parent class loader (and the class loaders above the parent class loader in the hierarchy of class loaders, if any) cannot service the load class request. After the load class request is delegated to the appropriate one of the module class loaders in the class loader chain, the module class loader may load the class. In one embodiment, the module class loader may cache the loaded class to an associated loaded class cache.

As an example of modules that may be hot deployed using embodiments of the class loader mechanism as described herein, the J2EE Connector architecture provides a Java™ solution to the problem of connectivity between multiple application servers and enterprise information systems (EISs) using resource adapters. Within the J2EE Connector architecture, support for deployment of standalone RARs (Resource adapter modules) is mandated. Since a RAR and its classes may be used by multiple applications deployed in an application server instance, the RAR needs to be realized via a class loader that is placed higher in the class loader hierarchy and serving as a parent class loader to all deployed J2EE applications. Using an embodiment of the class loader mechanism, a shared delegator class loader may be employed in application server implementations to realize all RARs; the shared delegator class loader either is a direct parent of all deployed applications in the application server instance or lies in the path from a deployed application to the root class loader. The shared delegator class loader may maintain a chain of deployed module class loaders, each associated with a particular RAR, for loading classes of the RARs. Load class requests for the RARs received by the shared delegator class loader may be delegated to the appropriate module class loaders in the class loader chain. RARs can be redeployed to the application server by undeploying the RAR from the application server and undeploying the associated module class loader from the class loader chain, and then redeploying the new version of the RAR to the application server and redeploying the new version of its associated module class loader to the class loader chain. Other than updating a data structure used to track module class loaders deployed to the chain, the shared delegator class loader is not affected by the redeployment.

Figure 1:
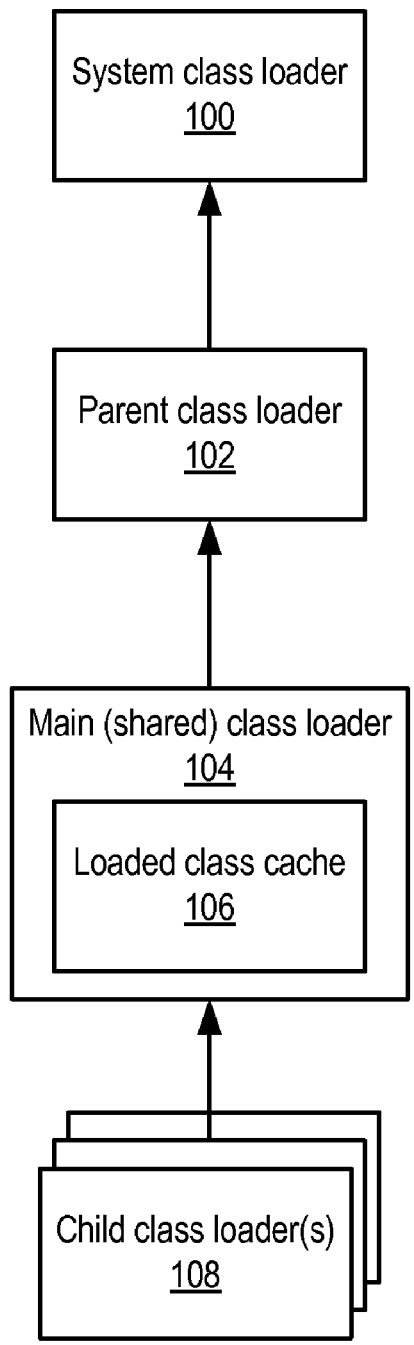
FIG. 1 illustrates a portion of an exemplary class loader hierarchy including a shared class loader.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a system and method for the hot deployment of shared modules in systems including application servers are described. Embodiments may provide a class loader mechanism for hot deployment of modules such as standalone resource adaptor modules (RARs). The class loader mechanism may utilize, in a hierarchy of class loaders, a shared "delegator" class loader which delegates the loading of classes to a list or "chain" of redeployable individual class loaders, each representing a module (e.g., a RAR), which may be referred to as "module class loaders." Using embodiments of the class loader mechanism, hot deployment of modules results in the redeployment of the associated individual class loaders in the chain rather than in a single, shared class loader.

In embodiments of the class loader mechanism, the delegator class loader maintains a chain of "deployed" module class loaders. The class loaders in the chain are independent class loaders that load the classes of deployed modules. In one embodiment, when a module is deployed, its associated class loader is added to the "end" of the chain. If and when the module is undeployed, its associated class loader is removed from the chain. When a different version of the module is redeployed, a new class loader for the module is added to the chain. Note that, in one embodiment, the module class loaders in the chain may be deployed as child class loaders of the same parent class loader as the delegator class loader.

In one embodiment, the delegator class loader does not itself directly load any classes; instead, it delegates all "load class" requests received from its "child" class loaders to class loaders in the chain. When a request for a class is received from a child class loader, the delegator class loader traverses the chain to find the class loader to load the class. In one embodiment, traversal of the chain may be performed sequentially, from the oldest class loader in the chain to the newest. Note that the delegator class loader may first delegate the request to its parent class loader, and thus may only attempt to delegate the load class request to the chain of class loaders if the parent class loader (and the class loaders above the parent class loader in the hierarchy of class loaders, if any) cannot service the load class request.

The module class loader in the chain that loads the class may be referred to as the defining class loader. The defining class loader includes the loaded class's cache. Thus, the loaded class cache is isolated to the independent, defining class loaders in the chain rather than in one aggregate class loader, and thus a module may be dynamically redeployed and the proper version of the classes of the module accessed without affecting other modules or requiring the application server to be restarted.

In a Java™ or similar implementation of the class loader mechanism, the mechanism does not jeopardize type-safe linkage provided by the class loading model. The mechanism maintains temporal namespace consistency per class loader instance and maintains namespace consistency among delegating class loaders (i.e. the loading constraints achieve type-safe linkage).

Embodiments of the class loader mechanism as described herein may be implemented according to the Java™ programming language and the Java™ Virtual Machine (JVM) architecture. Note, however, that embodiments may also be implemented according to other architectures, programming languages, environments including other virtual machine environments, platforms, applications, application servers and/or implementations of class loaders.

FIGS. 2-7 illustrate means for a delegator class loader in a hierarchy of class loaders to delegate load class requests to module class loaders in a class loader chain of one or more module class loaders, means for deploying module class loaders configured to load classes to the class loader chain, and means for redeploying different versions of the module class loaders configured to load different versions of the classes to the class loader chain.

Figure 2:
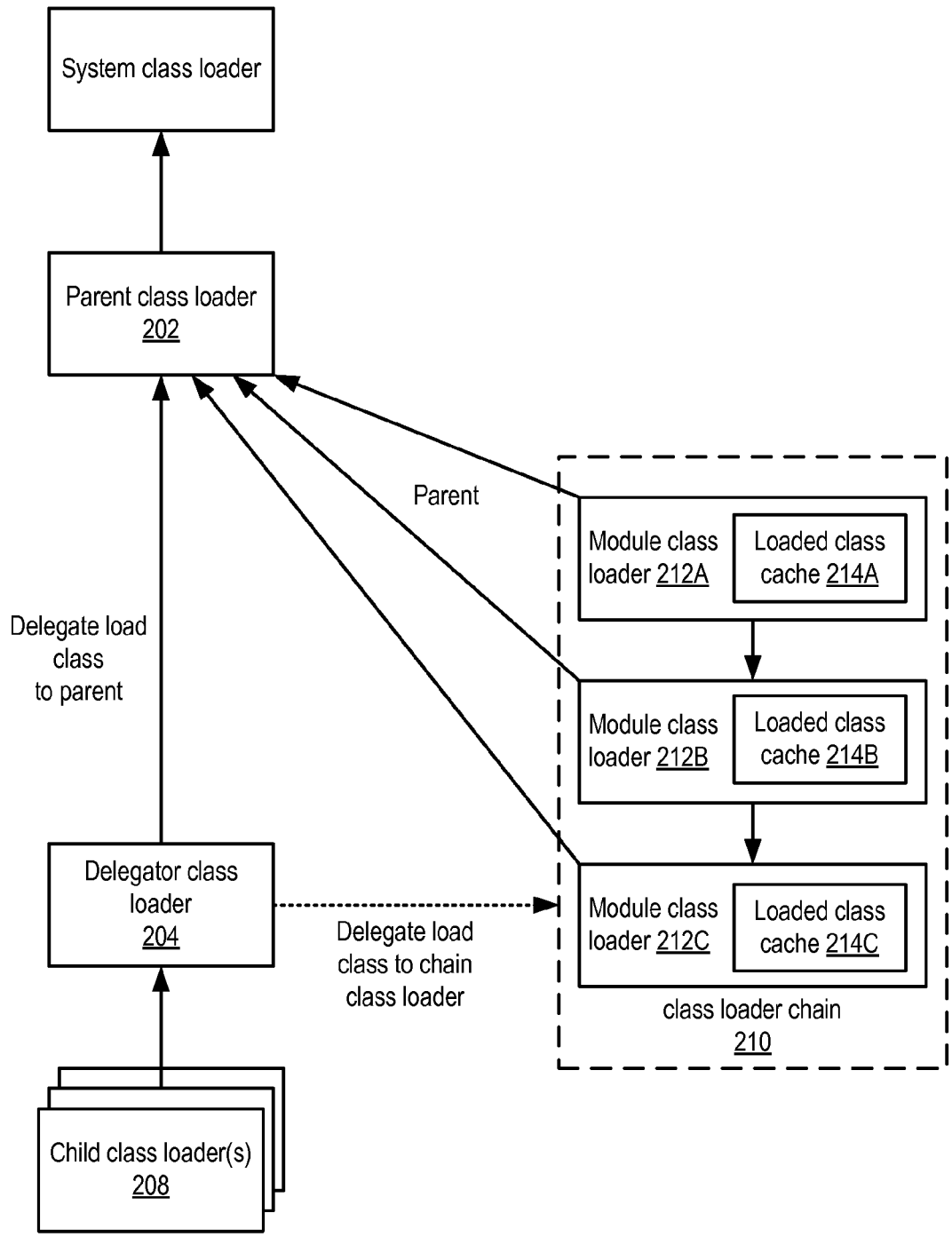
FIG. 2 illustrates a class loader mechanism in an exemplary class loader hierarchy according to one embodiment.

FIG. 2 illustrates a class loader mechanism in an exemplary class loader hierarchy according to one embodiment. The class loader mechanism provides a shared delegator class loader 204 and a class loader chain 210 in lieu of the single shared class loader representing and loading the classes of all modules (e.g., standalone resource adapters) as was illustrated in FIG. 1. Each module class loader 212 in the chain 210 represents one shared, self-contained module (e.g., standalone resource adapter module) and is thus individually hot-deployable. The parent of the module class loaders 212 in the chain is set to the parent class loader 202 of the delegator class loader 204. In one embodiment, delegator class loader 204 does not maintain a loaded class cache. Instead, each module class loader 212 in class loader chain 210 maintains its own loaded class cache 214. Note that, while FIG. 2 and subsequent Figures show the loaded class caches 214 within the module class loaders 212, the loaded class caches 214 may be implemented external to the module class loaders 212.

In one embodiment, unlike conventional class loading hierarchies such as the exemplary class loading hierarchy illustrated in FIG. 1, delegator class loader 204 (e.g., ConnectorClassLoader for RARs) does not serve as the defining class loader for any class, in spite of it being in the class loader hierarchy. Instead, delegator class loader 204 acts as a delegator that delegates to its parent class loader 202 and to module class loaders 212 in its class loader chain 210 to satisfy a request for a class from a child class loader 208, and does not directly load classes itself.

In class loading models such as the Java™ class loading model, each class loader can have only one parent. Thus, a child class loader 208 cannot have multiple parents. A child class loader 208 cannot have each module class loader 212 in the class loader chain 210 as a parent. Therefore, the delegator class loader 204 is the parent of all the child class loaders 208, and delegates class loading to the individual module class loaders 212 in the chain 210. The parent class loader 202 of the delegator class loader 204 is also the parent of each of the module class loaders 212 in the chain 210. The delegator class loader 204 first delegates a load class request to the parent class loader 202 so that class loaders cannot be inserted to override classes that should be loaded by class loaders higher in the hierarchy, thus maintaining temporal namespace consistency. In one embodiment, module class loaders 212 in chain 210 should not have child class loaders.

If the parent class loader 202 (or class loaders higher in the hierarchy) cannot load the class, the request is returned to the delegator class loader 204, which then delegates the class loading to one of the module class loaders 212 in the chain 210. In one embodiment, to delegate the class loading to one of the module class loaders 212 in the chain 210, the delegator class loader 204 traverses the chain 210 of module class loaders 212 to locate the correct module class loader 212 to load the class. In one embodiment, the chain 210 is traversed in the order of deployment of the module class loaders 212, starting with the oldest deployed module class loader 212 in the chain 210. Note that other embodiments may traverse the chain 210 in other orders. In one embodiment, since the delegator class loader 204 first delegates a load class request to its parent class loader 202 before delegating the load class request to a module class loader 212 in chain 210, the module class loaders 212 do not delegate load class requests to their parent class loader (parent class loader 202). If none of the module class loaders 212 in the chain 210 can load the class, an exception may be thrown.

Note that FIG. 2 is a simplified example of a class loader hierarchy in an application server. In embodiments, there may be two or more parent class loaders in a hierarchy, and there may be two or more delegator class loaders 204 each with one or more child class loaders 208 and an associated chain 210 of one or more module class loaders 212.

Figure 3:
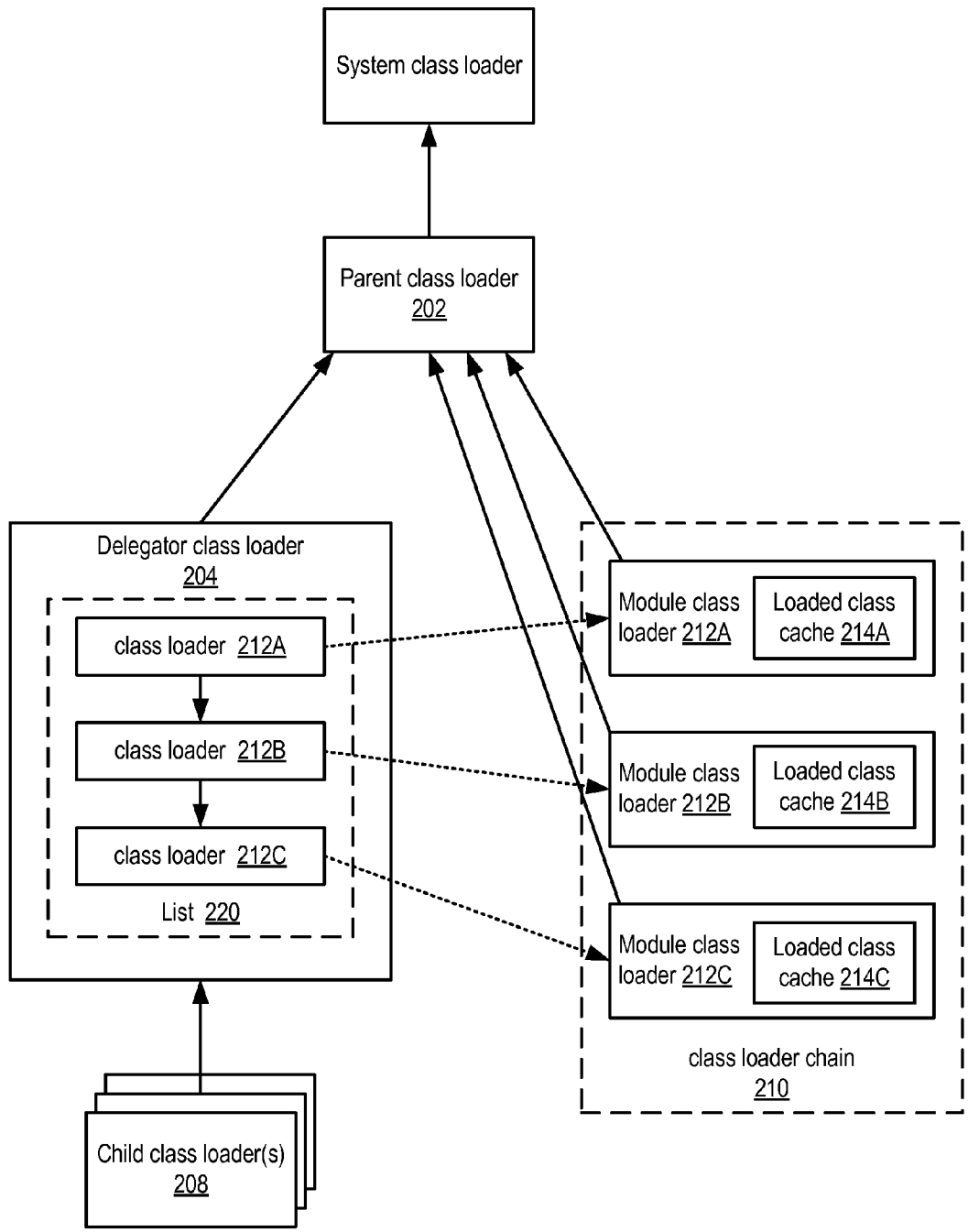
FIG. 3 illustrates a chain of class loaders identified by a data structure in the delegator class loader according to one embodiment.

FIG. 3 illustrates a chain of class loaders identified by a data structure in the delegator class loader according to one embodiment. In one embodiment, there may be no link between the module class loaders 212 in the chain 210, and no interdependency between the module class loaders 212 in the chain 210. The delegator class loader 204 is the "link". In one embodiment, the delegator class loader 204 maintains some data structure, for example a list 220 of records with one record for each module class loader, that identifies the module class loaders 212 in the chain 210 and that the delegator class loader 204 traverses to locate the correct module class loader 212 to load a class. In this embodiment, when a module class loader 212 is deployed to the chain 210, a record indicating the module class loader 212 is added to the list 220. In one embodiment, records for newly deployed class loaders are added to the end of the list 220, and the list 220 is traversed in first-in, first-out (FIFO) order to locate a module class loader 212 to load a class. When a module class loader 212 is undeployed, the record associated with the module class loader 212 is removed from the list 220.

Figure 4A:
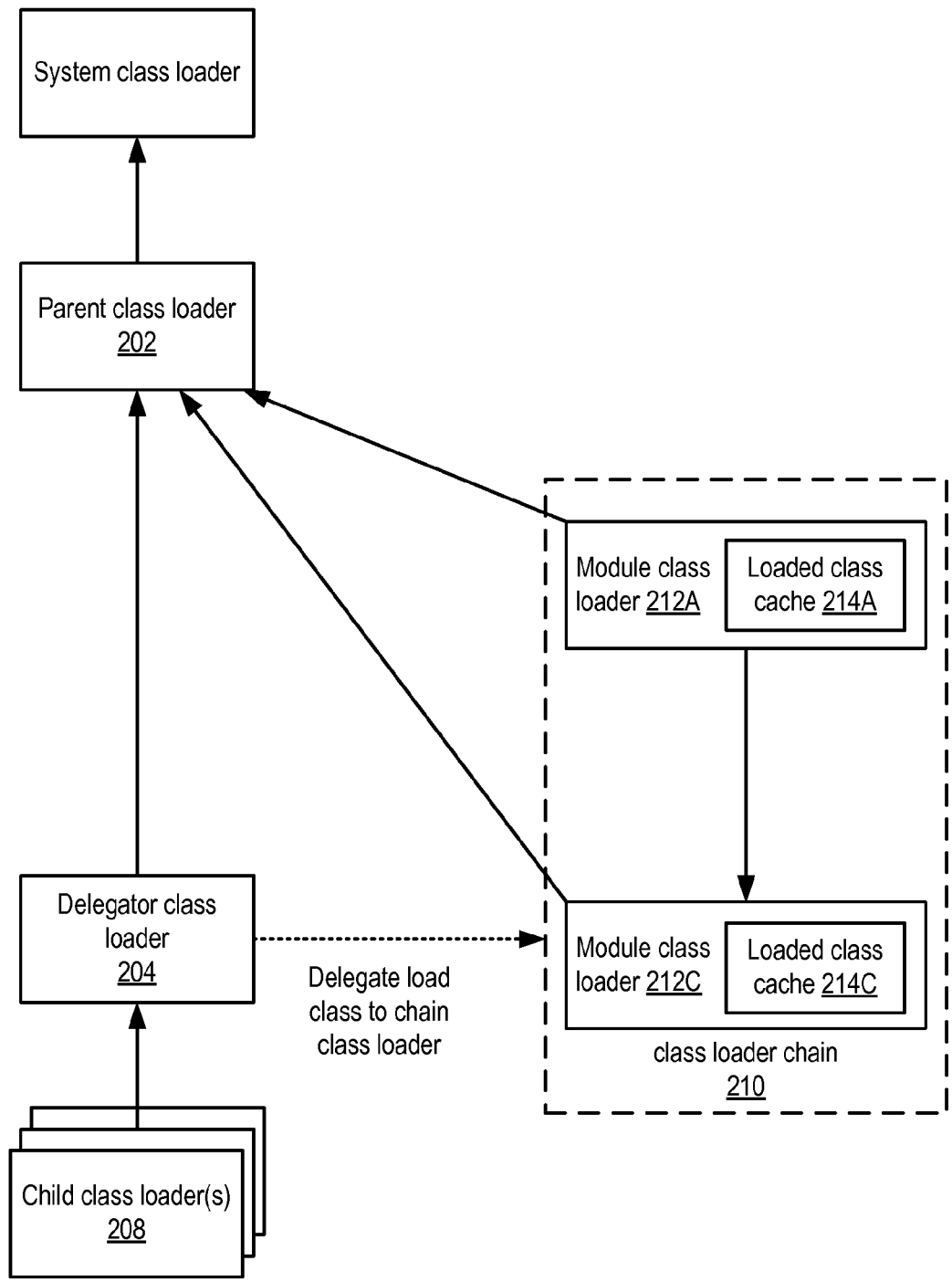
FIGS. 4A and 4B illustrate redeployment of a module according to one embodiment.
Figure 4B:
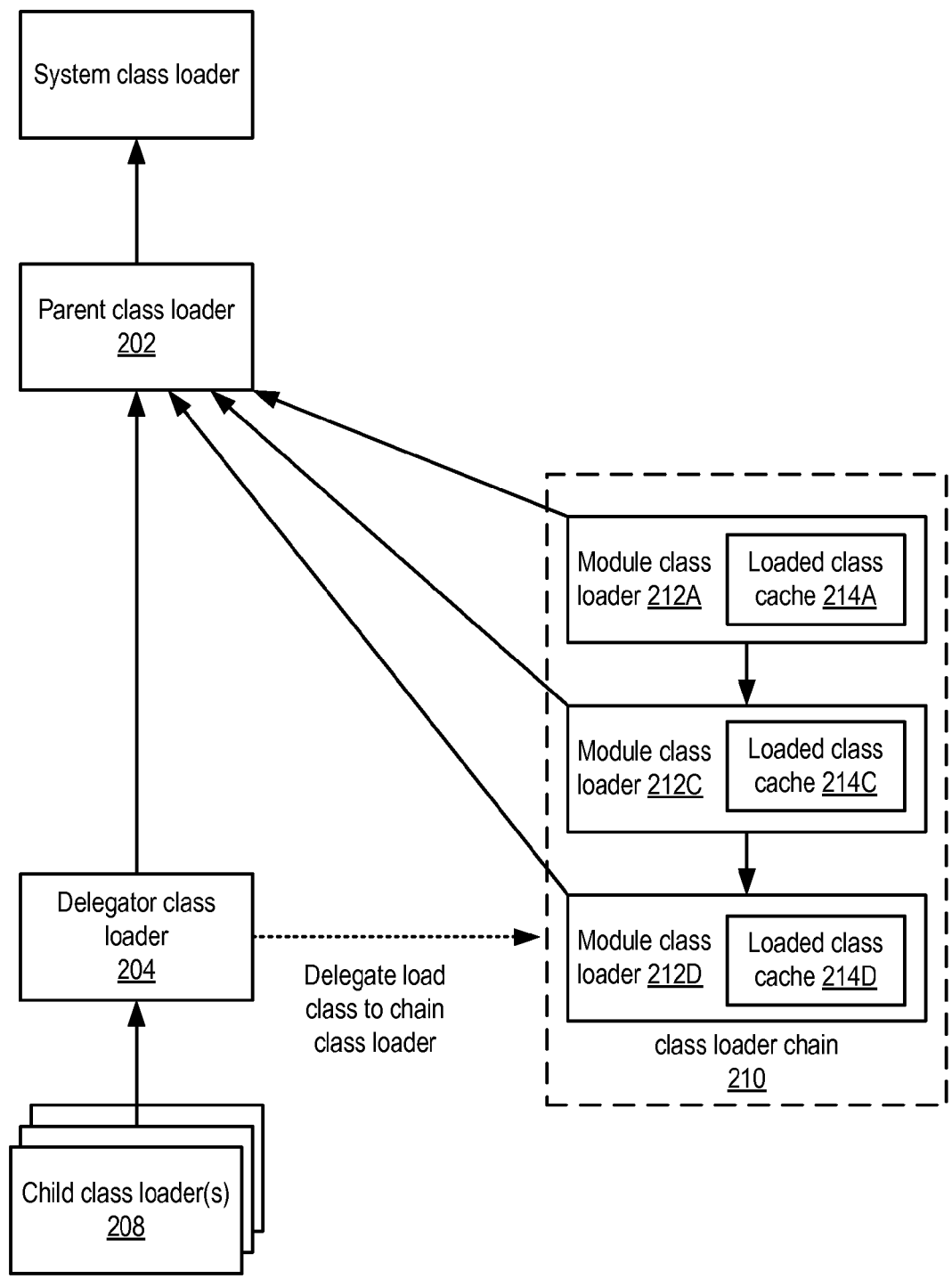

FIGS. 4A and 4B illustrate redeployment of a module according to one embodiment. When a module, for example a standalone resource adapter, is deployed, a new module class loader 212 is created in the class loader chain 210. The new class loader is initialized with the location where the module classes can be found. For example, when a standalone resource adapter is redeployed, the corresponding class loader in the chain 210 (in this example, module class loader 212B of FIG. 2) is destroyed as illustrated in FIG. 4A, and recreated in the class loader chain 210 with a new module class loader 212D that is initialized to the location where the new classes can be found, as illustrated in FIG. 4B. Note that the loaded class cache 214B of module class loader 212B is also destroyed, and a new loaded class cache 214D is initialized for the new module class loader 212D. Thus, on subsequent requests for a class by a child class loader 208 that are delegated to the new module class loader 212D, the new module class loader 212D resolves (or provides from the loaded class cache 214D, if the class is already resolved and thus cached in loaded class cache 214D) the correct version of the class of the redeployed module.

In one embodiment, when modules and their associated module class loaders 212 are redeployed, applications that depend on the modules may need to be redeployed, or restarted, as well.

In Java™ technology, a Type may be represented as $<T_i, L_i>L^i$, where $T_i$ is the fully qualified name of the class, $L_i$ is the defining class loader of the Type and $L^i$ is the initiating class loader of the Type. In one embodiment, the load class method (in Java™, the loadClass( )method) of the delegator class loader 204 (for standalone resource adaptors, ConnectorClassLoader), may be overridden and modified to work according to the following algorithm. If the parent class is not equal to null, the loading of a class is delegated to the parent class loader via parent.loadClass( ). If the parent class is not able to satisfy the request for a class, the class loader chain representing all the deployed modules (e.g., standalone resource adapters), is traversed (in one embodiment, according to the temporal order of module deployment, with the first deployed class loader first in the order). During traversal, for each module class loader 212 in the chain 210, the delegator class loader 204 may delegate to the load class method of the class loader in the chain (e.g., classLoaderInChainAtPosition'j'.loadClass( ). If the load class method of the current class loader (j) in the chain (e.g., classLoaderInChainAtPosition'j') satisfies the request for the class, the class $<T_i, L_{i,j}>L_i$ is returned. If not, increment 'j' and go to the next class loader in the chain. If the class is not found via the traversal of the chain, a ClassNotFoundException may be thrown.

The Type of the class is thus $<T_i, L_{i,j}>L^i$, where $T_i$ is the fully qualified name of the class, $L_i$ is the delegator class loader that houses the defining class loader, j is the "actual" defining class loader where 'j' is the index of the class loader in the chain of $L_i$, and $L^i$ is the initiating class loader of the Type.

The temporal namespace consistency with respect to the (class loader, class combination) is valid and the virtual machine associates the types loaded by $L_{i,j}$ class loader with $L_{i,j}$ and returns it from the cache as long as $L_{i,j}$ is valid and present in the chain. Thus, loading constraints imposed by the virtual machine may be maintained to ensure type-safe linkage.

In one embodiment, during redeployment, the class loader that represents the module (e.g., the standalone resource adapter module) that is to redeployed is destroyed and recreated, and all applications that use classes that were loaded by $L_{i,j}$ have to be redeployed to get access to the new type definitions. If this redeployment of all dependent applications is not performed, one or more exceptions (e.g. ClassCastException, LinkageError, and/or IllegalAccessExceptions as indicated by the Java™ Language Specification) may result.

In one embodiment, if two Types with identical fully qualified class names T are defined in two modules (e.g., two standalone resource adapter modules) realized by $L_{i,j}$ and $L_{i,(j+1)}$, the type $<T, L_{i,(j+1)}>$ is hidden/masked by $<T, L_{i,j}>$ as $L_{i,j}$ lies earlier in the chain, and the delegator class loader uses the order of deployment of the modules for traversal.

In one embodiment, applications that use the delegator class loader, for example J2EE applications that use the standalone resource adapter, are oblivious to the class loading mechanism and work as-is. However, when redeploying modules such as stand-alone resource adapters, dependent applications may need to be redeployed as described above.

Figure 5:
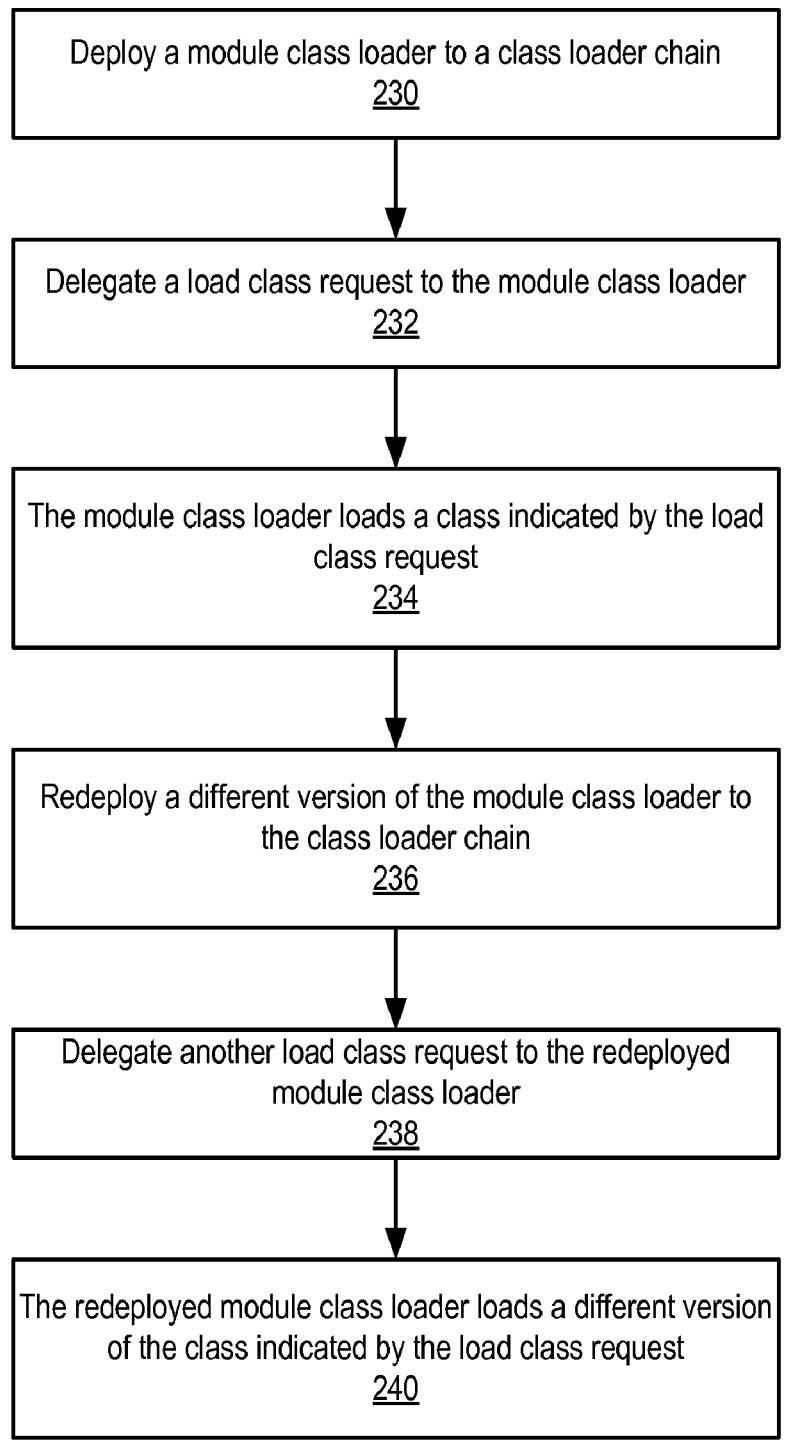
FIG. 5 is a flowchart of a method for hot deployment of modules on a system according to one embodiment.

FIG. 5 is a flowchart of a method for hot deployment of modules on a system according to one embodiment. The system may include an embodiment of a class loader mechanism including a hierarchy of class loaders. At least one of the class loaders may be a delegator class loader that maintains a class loader chain. In one embodiment, the delegator class loader may maintain a data structure, such as a list, for keeping track of and locating module class loaders deployed to the class loader chain. As indicated at 230, a module class loader configured to load one or more classes of a module deployed on the system may be deployed to the class loader chain. In one embodiment, the parent of the deployed module class loader may be set to the parent class loader of the delegator class loader. The data structure in the delegator class loader may be updated to indicate the newly-deployed class loader. In one embodiment, to maintain temporal consistency, a record for the newly-deployed class loader may be added to the end of the list.

The delegator class loader may receive a load class request from one of its one or more child class loaders in the hierarchy of class loaders. As indicated at 232, the delegator class loader may delegate the load class request to the module class loader in the class loader chain. In one embodiment, the delegator class loader may first delegate the load class request to the parent class loader of the delegator class loader in the hierarchy of class loaders and, if the parent class loader cannot load the class indicated by the load class request, the delegator class loader may delegate the load class request to the module class loader in the class loader chain. In one embodiment, the delegator class loader may maintain a data structure, such as a list, for keeping track of and locating module class loaders deployed to the class loader chain. To delegate a load class request to a module class loader in the class loader chain, the delegator class loader may traverse the list to locate the module class loader configured to load the class indicated by the load class request. In one embodiment, to maintain temporal consistency, the delegator class loader may traverse the list according to order of deployment of the module class loaders in the class loader chain from a first deployed module class loader to a last deployed module class loader.

After the delegator class loader delegates the load class request to the module class loader in the class loader chain, the module class loader may load the class or classes indicated by the load class request, as indicated at 234. In one embodiment, the module class loader may include a loaded class cache, and may also cache the loaded class(es) to the loaded class cache.

As indicated at 236, a different version of the module class loader, configured to load one or more classes of a different version of the module redeployed on the system, may be redeployed to the class loader chain. To redeploy the different version of the module class loader, the module class loader may be undeployed (removed) from the class loader chain, and the different version of the module class loader may be redeployed (added) to the class loader chain. In one embodiment, the different version of the module class loader may be added at the "end" of the class loader chain to maintain temporal consistency. In one embodiment, the deployer class loader maintains a data structure, such as a list, indicating module class loaders deployed to the class loader chain. In this embodiment, a record indicating the original version of the module class loader may be removed from the list, and a new record indicating the different version of the module class loader may be added to the list.

The delegator class loader may receive another load class request from one of its one or more child class loaders in the hierarchy of class loaders. The delegator class loader may then delegate the new load class request to the redeployed module class loader, as indicated at 238. After the delegator class loader delegates the load class request to the different version of the module class loader in the class loader chain, the different version of the module class loader may load a different version of the class or classes indicated by the load class request, as indicated at 240.

Figure 6:
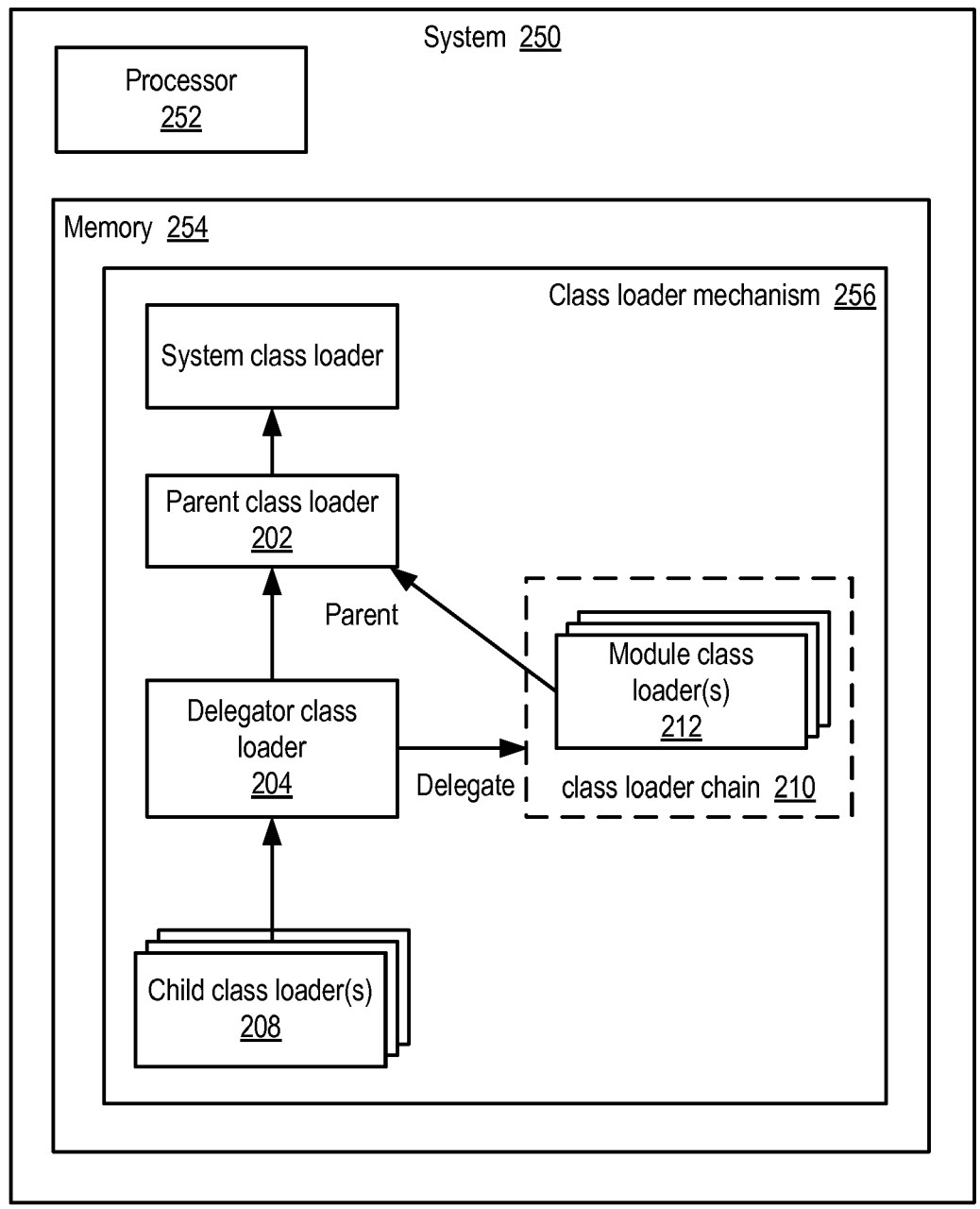
FIG. 6 illustrates a system implementing a class loader mechanism according to one embodiment.

FIG. 6 illustrates a system implementing a class loader mechanism according to one embodiment. System 250 may be any of various types of devices, including, but not limited to, a personal computer system, desktop computer, laptop or notebook computer, mainframe computer system, workstation, network computer, Personal Digital Assistant (PDA), cell phone, pager, smart appliances or other suitable device. In general, system 250 may be any device with a digital heartbeat. System 250 may include at least one processor 252. The processor 252 may be coupled to a memory 254. Memory 254 is representative of various types of possible memory media, also referred to as "computer readable media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof. System 250 may couple over a network to one or more other devices via one or more wired or wireless network interfaces.

System 250 may include, in memory 254, an embodiment of a class loader mechanism 256 as described herein. In one embodiment, system 250 may include a virtual machine in memory 254 (e.g. a Java™ Virtual Machine (JVM)) that may include class loader mechanism 256. In one embodiment, two or more virtual machines may be included simultaneously in memory 254. In one embodiment, memory 254 may include an implementation of an application server that may include class loader mechanism 256.

The class loader mechanism 256 maintains a class loader chain 210. Each module class loader 212 in the chain 210 represents one shared, self-contained module and is thus individually hot-deployable. In one embodiment, delegator class loader 204 does not itself load classes, and so does not maintain a loaded class cache. Instead, each module class loader 212 in class loader chain 210 maintains its own loaded class cache. The parent class loader 202 of the delegator class loader 204 is also the parent of each of the module class loaders 212 in the chain 210.

Upon receiving a request for a class from a child class loader 208, the delegator class loader 204 first delegates the request to the parent class loader 202 so that class loaders cannot be inserted to override classes that should be loaded by class loaders higher in the hierarchy, thus maintaining temporal namespace consistency. If the parent class loader 202 (or class loaders higher in the hierarchy) cannot load the class, the request is returned to the delegator class loader 204, which then delegates the class loading to one of the module class loaders 212 in the chain 210. In one embodiment, to delegate the class loading to one of the module class loaders 212 in the chain 210, the delegator class loader 204 traverses the chain 210 of module class loaders 212. In one embodiment, the chain 210 is traversed in the order of deployment of the module class loaders 212, starting with the oldest deployed module class loader 212 in the chain 210. Note that other embodiments may traverse the chain 210 in other orders. If none of the module class loaders 212 in the chain 210 can load the class, an exception may be thrown.

Figure 7:
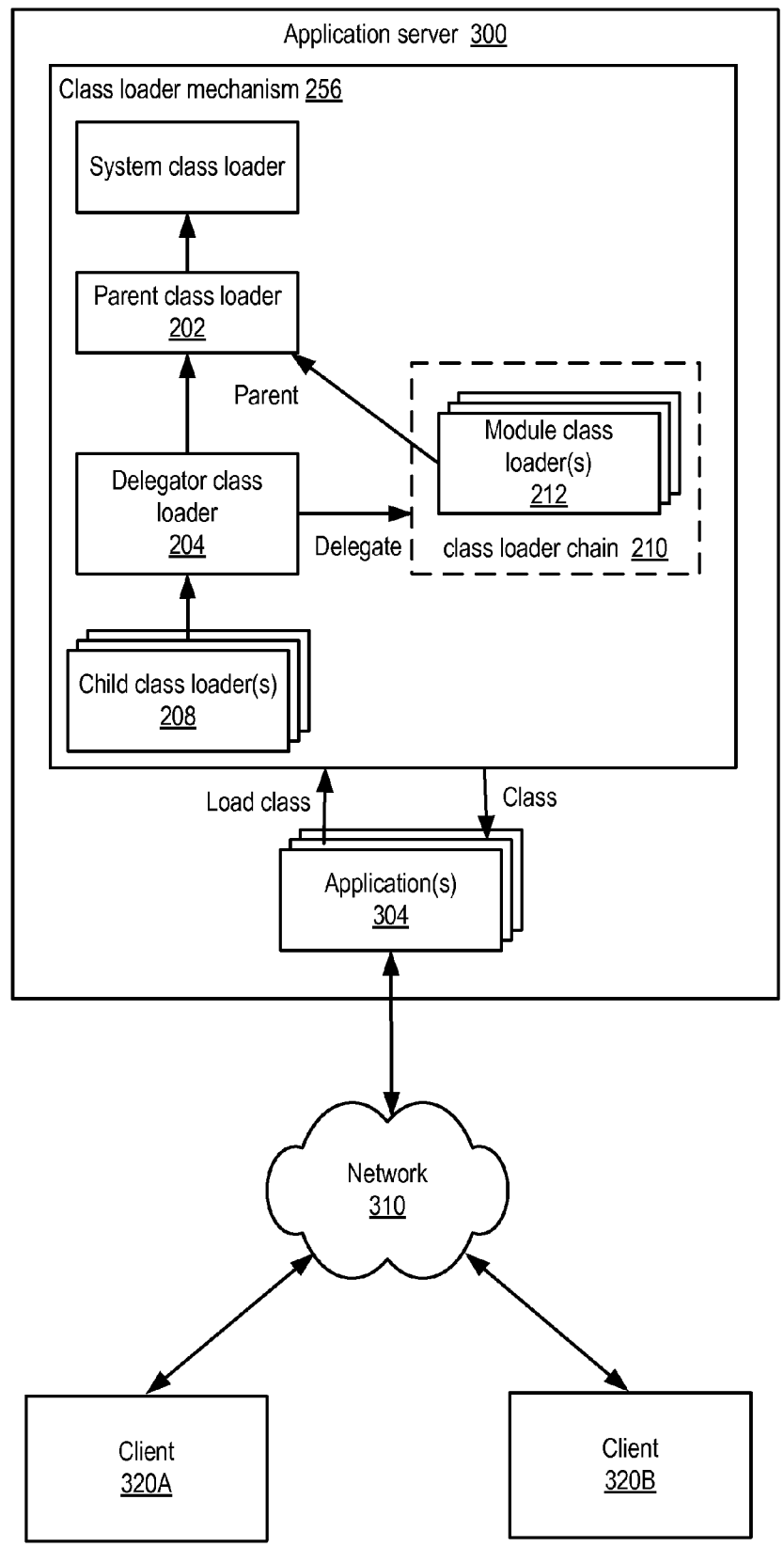
FIG. 7 illustrates the class loader mechanism implemented in an application server in an exemplary distributed computing system according to one embodiment.

FIG. 7 illustrates the class loader mechanism implemented in an application server in an exemplary distributed computing system according to one embodiment. Application server 300 may include one or more applications 304. One or more client systems 320 may access applications 304 on application server 300 via network 310. In one embodiment, application server 300 may be a J2EE application server.

Application server 300 may include an embodiment of class loader mechanism 256 as described herein for loading classes of applications 304 and/or classes of other components of application server 300, such as standalone resource adaptor modules (RARs). Class loader mechanism 256 may implement a hierarchy of class loaders. At least one of the class loaders in the hierarchy may be a delegator class loader 204 that may delegate load class requests to one or more module class loaders 212 maintained in a class loader chain 210. In one embodiment, delegator class loader 204 may first delegate a load class request to a parent class loader 202 of the delegator class loader 204, and then delegate the load class request to one of the module class loaders 212 in the class loader chain 210 if the parent class loader 202 cannot load the class.

To hot-deploy a different version of a module deployed on application server 300, such as a standalone resource adaptor module (RAR) on application server 300, the module class loader 212 associated with the module may be undeployed from class loader chain 210, and a different version of the module class loader 212 for loading classes of the different version of the module may be redeployed to the class loader chain 210. Note that, other than updating a data structure indicating the module class loaders 212 deployed to class loader chain 210, delegator class loader 204 is not affected. Also note that application server 300 does not need to be restarted for new versions of the classes to be loaded by the redeployed module class loader 212. However, one or more applications 304 that depend on the classes loaded by the redeployed module class loader may need to be redeployed, or restarted, as well.

As an example of modules that may be hot deployed using embodiments of the class loader mechanism as described herein, the J2EE Connector architecture provides a Java™ solution to the problem of connectivity between multiple application servers and enterprise information systems (EISs) using resource adapters. By using the J2EE Connector architecture, EIS vendors no longer need to customize their product for each application server. Application server vendors that conform to the J2EE Connector architecture do not need to write custom code to add connectivity to a new EIS.

Within the J2EE Connector architecture, support for deployment of standalone RARs (Resource adapter modules) is mandated. The standalone deployment of a resource adapter is typically performed to support scenarios where the resource adapter is provided as a standalone module. The J2EE Connector architecture allows standalone RARs to be shared by multiple J2EE applications. This allows multiple J2EE applications deployed in an application server instance to share a single resource adapter module.

Since an RAR and its classes may be used by multiple applications deployed in an application server instance, the RAR needs to be realized via a class loader that is placed higher in the class loader hierarchy and serving as a parent class loader to all deployed J2EE applications. Using an embodiment of the class loader mechanism as described herein, a shared delegator class loader may be employed in application server implementations to realize all RARs; the shared delegator class loader either is a direct parent of all deployed applications in the application server instance or lies in the path from a deployed application to the root class loader. The shared delegator class loader may maintain a chain of module class loaders, each associated with a particular RAR, for loading classes of the RARs. Load class requests for the RARs received by the shared delegator class loader may be delegated to the appropriate module class loaders in the class loader chain. RARs can be redeployed to the application server by undeploying the RAR from the application server and undeploying the associated module class loader from the class loader chain, and then redeploying the new version of its associated module class loader to the class loader chain and redeploying the new version of the RAR to the application server. Other than updating a data structure used to track module class loaders deployed to the chain, the shared delegator class loader is not affected by the redeployment.

Since the shared delegator class loader that realizes all RARs and is shared by multiple applications deployed in the application server instance does not have to be undeployed and redeployed to redeploy a RAR and its associated module class loader, the hot deployment of RARs may be performed on an application server instance. Further, loaded classes are cached in the loaded class caches associated with the individual module class loaders in the class loader chain, and not in a loaded class cache associated with the shared delegator class loader. Therefore, after redeploying a RAR and its associated module class loader, a subsequent load class request delegated to the redeployed module class loader by the delegator class loader will return the correct version of the class rather than an old version cached in the loaded class cache of the shared delegator class loader.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
a processor; and
a memory comprising program instructions, wherein the program instructions are executable by the processor to implement a class loader mechanism comprising a hierarchy of class loaders, wherein the hierarchy of class loaders comprises a delegator class loader and a parent class loader of the delegator class loader, wherein the delegator class loader is configured to:
receive a load class request from one of one or more child class loaders of the delegator class loader in the hierarchy of class loaders; and
delegate the load class request to a module class loader in a class loader chain comprising one or more module class loaders, wherein the parent of each of the one or more module class loaders in the class loader chain is set to the parent class loader of the delegator class loader;
wherein the module class loader in the class loader chain is configured to load a class indicated by the load class request.

2. The system as recited in claim 1, wherein, to delegate the load class request to a module class loader in a class loader chain comprising one or more module class loaders, the delegator class loader is further configured to:
delegate the load class request to the parent class loader of the delegator class loader in the hierarchy of class loaders; and
delegate the load class request to the module class loader in the class loader chain if the parent class loader cannot load the class indicated by the load class request.

3. The system as recited in claim 1, wherein the module class loader in the class loader chain is further configured to cache the loaded class in a loaded class cache of the module class loader.

4. The system as recited in claim 1, wherein, to delegate the load class request to a module class loader in a class loader chain comprising one or more module class loaders, the delegator class loader is further configured to:

maintain a list indicating the one or more module class loaders in the class loader chain; and traverse the list to locate the module class loader configured to load the class indicated by the load class request.

5. The system as recited in claim 4, wherein the delegator class loader is further configured to traverse the list according to order of deployment of the one or more module class loaders in the class loader chain from a first deployed module class loader to a last deployed module class loader.

6. The system as recited in claim 1, wherein the class loader mechanism is configured to:

undeploy the module class loader from the class loader chain; and redeploy a different version of the module class loader to the class loader chain.

7. The system as recited in claim 6, wherein the different version of the module class loader is configured to load a different version of the class indicated by a subsequent load class request delegated to the different version of the module class loader by the delegator class loader.

8. The system as recited in claim 1, wherein the program instructions are further executable by the processor to implement a virtual machine on the system, wherein the class loader mechanism is executable within the virtual machine.

9. The system as recited in claim 8, wherein the virtual machine is a platform-independent programming language virtual machine.

10. The system as recited in claim 1, wherein each module class loader in the class loader chain is associated with a different module deployed on the system.

11. The system as recited in claim 10, wherein the modules are standalone resource adaptor modules of a connector architecture of a programming platform for developing and deploying distributed multitier architecture applications.

12. A system, comprising:

a processor; and a memory comprising program instructions, wherein the program instructions are executable by the processor to implement a class loader mechanism comprising a hierarchy of class loaders, wherein the hierarchy of class loaders comprises a delegator class loader and a parent class loader of the delegator class loader, wherein the class loader mechanism is configured to:

deploy a module class loader to a class loader chain comprising one or more module class loaders, wherein the deployed module class loader is configured to load one or more classes of a module deployed on the system in response to a load class request from one of one or more child class loaders of the delegator class loader delegated to the module class loader by the delegator class loader;

undeploy the module class loader from the class loader chain; and redeploy a different version of the module class loader to the class loader chain, wherein the different version of the module class loader is configured to load one or more classes of a different version of the module deployed on the system in response to a subsequent load class request delegated to the different version of the module class loader by the delegator class loader;

wherein the parent of each of the one or more module class loaders in the class loader chain is set to the parent class loader of the delegator class loader.

13. The system as recited in claim 12, wherein the delegator class loader is configured to:

receive a load class request from one of the one or more child class loaders of the delegator class loader in the hierarchy of class loaders;

delegate the load class request to the parent class loader of the delegator class loader in the hierarchy of class loaders; and delegate the load class request to the module class loader in the class loader chain if the parent class loader cannot load the class indicated by the load class request.

14. The system as recited in claim 12, wherein the module class loader is further configured to cache the loaded classes in a loaded class cache of the module class loader.

15. The system as recited in claim 12, wherein, to delegate a load class request to the module class loader in the class loader chain, the delegator class loader is configured to:

maintain a list of the one or more module class loaders in the class loader chain; and traverse the list to locate the module class loader indicated by the load class request.

16. The system as recited in claim 15, wherein the delegator class loader is further configured to traverse the list according to order of deployment of the one or more module class loaders in the class loader chain from a first deployed module class loader to a last deployed module class loader.

17. The system as recited in claim 12, wherein the program instructions are further executable by the processor to implement a virtual machine on the system, wherein the class loader mechanism is executable within the virtual machine.

18. The system as recited in claim 17, wherein the virtual machine is a platform-independent programming language virtual machine.

19. The system as recited in claim 12, wherein the module is a standalone resource adaptor module of a connector architecture of a programming platform for developing and deploying distributed multitier architecture applications.

20. A system, comprising:

means for delegating, by a delegator class loader in a hierarchy of class loaders, a load class request from one of one or more child class loaders of the delegator class loader in the hierarchy of class loaders to a module class loader in a class loader chain comprising one or more module class loaders, wherein the parent of each of the one or more module class loaders in the class loader chain is set to the parent class loader of the delegator class loader in the hierarchy of class loaders, and wherein the module class loader is configured to load one or more classes indicated by the load class request; and means for redeploying a different version of the module class loader to the class loader chain, wherein the different version of the module class loader is configured to load different versions of the one or more classes in response to a subsequent load class request.

21. A system, comprising:

means for deploying a module class loader to a class loader chain comprising one or more module class loaders, wherein the deployed module class loader is configured to load one or more classes of a module deployed on the system in response to a load class request from one of one or more child class loaders of a delegator class loader in a hierarchy of class loaders delegated to the deployed module class loader by the delegator class loader in the hierarchy of class loaders, wherein the parent of each of the one or more module class loaders in the class loader chain is set to the parent class loader of the delegator class loader in the hierarchy of class loaders; and means for redeploying a different version of the deployed module class loader to the class loader chain, wherein the different version of the deployed module class loader is configured to load one or more classes of a different version of the module deployed on the system in response to a subsequent load class request delegated to the different version of the deployed module class loader.

22. A computer-implemented method, comprising:

receiving a load class request from one of one or more child class loaders of a delegator class loader in a hierarchy of class loaders implemented on a computer system, wherein said receiving is performed by the delegator class loader;

delegating the load class request to a module class loader in a class loader chain comprising one or more module class loaders implemented on the computer system, wherein said delegating is performed by the delegator class loader, and wherein the parent of each of the one or more module class loaders in the class loader chain is set to the parent class loader of the delegator class loader in the hierarchy of class loaders; and loading a class indicated by the load class request, wherein said loading is performed by the module class loader.

23. The computer-implemented method as recited in claim 22, wherein said delegating the load class request to a module class loader in a class loader chain comprises:

delegating the load class request to the parent class loader of the delegator class loader in the hierarchy of class loaders; and delegating the load class request to the module class loader in the class loader chain if the parent class loader cannot load the class indicated by the load class request.

24. The computer-implemented method as recited in claim 22, further comprising caching the loaded class in a loaded class cache of the module class loader.

25. The computer-implemented method as recited in claim 22, wherein said delegating the load class request to a module class loader in a class loader chain comprises:

maintaining a list indicating the one or more module class loaders in the class loader chain; and traversing the list to locate the module class loader configured to load the class indicated by the load class request.

26. The computer-implemented method as recited in claim 25, wherein said traversing the list to locate the module class loader configured to load the class indicated by the load class request comprises traversing the list according to order of deployment of the one or more module class loaders in the class loader chain from a first deployed module class loader to a last deployed module class loader.

27. The computer-implemented method as recited in claim 22, further comprising:

undeploying the module class loader from the class loader chain; and redeploying a different version of the module class loader to the class loader chain.

28. The computer-implemented method as recited in claim 27, further comprising:

receiving another load class request from one of the one or more child class loaders of the delegator class loader in the hierarchy of class loaders, wherein said receiving another load class request is performed by the delegator class loader;

delegating the load class request to the different version of the module class loader in the class loader chain, wherein said delegating the load class request to the different version of the module class loader in the class loader chain is performed by the delegator class loader; and loading a different version of the class indicated by the load class request, wherein said loading a different version of the class indicated by the load class request is performed by the different version of the module class loader.

29. The computer-implemented method as recited in claim 22, wherein the hierarchy of class loaders is comprised in a virtual machine on the computer system.

30. The computer-implemented method as recited in claim 29, wherein the virtual machine is a platform-independent programming language virtual machine.

31. The computer-implemented method as recited in claim 22, wherein each module class loader in the class loader chain is associated with a different module deployed on the computer system.

32. The computer-implemented method as recited in claim 31, wherein the modules are standalone resource adaptor modules of a connector architecture of a programming platform for developing and deploying distributed multitier architecture applications.

33. A method, comprising:

deploying a module class loader to a class loader chain comprising one or more module class loaders, wherein the deployed module class loader is configured to load one or more classes of a module deployed on a computer system in response to a load class request from one of one or more child class loaders of a delegator class loader in a hierarchy of class loaders delegated to the module class loader by the delegator class loader in the hierarchy of class loaders;

undeploying the module class loader from the class loader chain; and redeploying a different version of the module class loader to the class loader chain, wherein the different version of the module class loader is configured to load one or more classes of a different version of the module deployed on the computer system in response to a subsequent load class request delegated to the different version of the module class loader by the delegator class loader;

wherein the parent of each of the one or more module class loaders in the class loader chain is set to the parent class loader of the delegator class loader in the hierarchy of class loaders.

34. The method as recited in claim 33, further comprising:

the delegator class loader receiving a load class request from one of the one or more child class loaders of the delegator class loader in the hierarchy of class loaders;

the delegator class loader delegating the load class request to the parent class loader of the delegator class loader in the hierarchy of class loaders; and the delegator class loader delegating the load class request to the module class loader in the class loader chain if the parent class loader cannot load the class indicated by the load class request.

35. The method as recited in claim 34, further comprising:

the module class loader loading a class indicated by the load class request; and the module class loader caching the loaded class in a loaded class cache of the module class loader.

36. The method as recited in claim 34, wherein said delegating the load class request to the module class loader in the class loader chain comprises:

the delegator class loader maintaining a list of the one or more module class loaders in the class loader chain; and the delegator class loader traversing the list to locate the module class loader indicated by the load class request.

37. The method as recited in claim 36, further comprising the delegator class loader traversing the list according to order of deployment of the one or more module class loaders in the class loader chain from a first deployed module class loader to a last deployed module class loader.

38. The method as recited in claim 33, wherein the hierarchy of class loaders is comprised in a virtual machine on the computer system.

39. The method as recited in claim 38, wherein the virtual machine is a platform-independent programming language virtual machine.

40. The method as recited in claim 33, wherein the module is a standalone resource adaptor module of a connector architecture of a programming platform for developing and deploying distributed multitier architecture applications.

41. A computer-accessible storage medium storing program instructions, wherein the program instructions are computer-executable to implement:
   a delegator class loader in a hierarchy of class loaders receiving a load class request from one of one or more child class loaders of the delegator class loader in the hierarchy of class loaders;
   the delegator class loader delegating the load class request to a module class loader in a class loader chain comprising one or more module class loaders, wherein the parent of each of the one or more module class loaders in the class loader chain is set to the parent class loader of the delegator class loader in the hierarchy of class loaders; and
   the module class loader loading a class indicated by the load class request.

42. The computer-accessible storage medium as recited in claim 41, wherein, in said delegating the load class request to a module class loader in a class loader chain, the program instructions are further computer-executable to implement:
   delegating the load class request to the parent class loader of the delegator class loader in the hierarchy of class loaders; and
   delegating the load class request to the module class loader in the class loader chain if the parent class loader cannot load the class indicated by the load class request.

43. The computer-accessible storage medium as recited in claim 41, wherein the program instructions are further computer-executable to implement the module class loader caching the loaded class in a loaded class cache of the module class loader.

44. The computer-accessible storage medium as recited in claim 41, wherein, in said delegating the load class request to a module class loader in a class loader chain, the program instructions are further computer-executable to implement:
   the delegator class loader maintaining a list indicating the one or more module class loaders in the class loader chain; and
   the delegator class loader traversing the list to locate the module class loader configured to load the class indicated by the load class request.

45. The computer-accessible storage medium as recited in claim 44, wherein the program instructions are further computer-executable to implement the delegator class loader traversing the list according to order of deployment of the one or more module class loaders in the class loader chain from a first deployed module class loader to a last deployed module class loader.

46. The computer-accessible storage medium as recited in claim 41, wherein the program instructions are further computer-executable to implement:
   undeploying the module class loader from the class loader chain; and
   redeploying a different version of the module class loader to the class loader chain.

47. The computer-accessible storage medium as recited in claim 46, wherein the program instructions are further computer-executable to implement:
   the delegator class loader receiving another load class request from one of the one or more child class loaders of the delegator class loader in the hierarchy of class loaders;
   the delegator class loader delegating the load class request to the different version of the module class loader in the class loader chain; and
   the different version of the module class loader loading a different version of the class indicated by the load class request.

48. The computer-accessible storage medium as recited in claim 41, wherein the hierarchy of class loaders is comprised in a virtual machine on a computer system.

49. The computer-accessible storage medium as recited in claim 48, wherein the virtual machine is a platform-independent programming language virtual machine.

50. The computer-accessible storage medium as recited in claim 41, wherein each module class loader in the class loader chain is associated with a different module deployed on a computer system.

51. The computer-accessible storage medium as recited in claim 50, wherein the modules are standalone resource adaptor modules of a connector architecture of a programming platform for developing and deploying distributed multitier architecture applications.

52. A computer-accessible storage medium storing program instructions, wherein the program instructions are computer-executable to implement:
   deploying a module class loader to a class loader chain comprising one or more module class loaders, wherein the deployed module class loader is configured to load one or more classes of a module deployed on a computer system in response to a load class request from one of one or more child class loaders of a delegator class loader in a hierarchy of class loaders delegated to the module class loader by the delegator class loader in the hierarchy of class loaders;
   undeploying the module class loader from the class loader chain; and
   redeploying a different version of the module class loader to the class loader chain, wherein the different version of the module class loader is configured to load one or more classes of a different version of the module deployed on the computer system in response to a subsequent load class request delegated to the different version of the module class loader by the delegator class loader;
   wherein the parent of each of the one or more module class loaders in the class loader chain is set to the parent class loader of the delegator class loader in the hierarchy of class loaders.

53. The computer-accessible storage medium as recited in claim 52, wherein the program instructions are further computer-executable to implement:
   the delegator class loader receiving a load class request from one of the one or more child class loaders of the delegator class loader in the hierarchy of class loaders;

the delegator class loader delegating the load class request to the parent class loader of the delegator class loader in the hierarchy of class loaders; and the delegator class loader delegating the load class request to the module class loader in the class loader chain if the parent class loader cannot load the class indicated by the load class request.

54. The computer-accessible storage medium as recited in claim 53, wherein the program instructions are further computer-executable to implement:

the module class loader loading a class indicated by the load class request; and the module class loader caching the loaded class in a loaded class cache of the module class loader.

55. The computer-accessible storage medium as recited in claim 53, wherein, in said delegating the load class request to the module class loader in the class loader chain, the program instructions are further computer-executable to implement:

the delegator class loader maintaining a list of the one or more module class loaders in the class loader chain; and the delegator class loader traversing the list to locate the module class loader indicated by the load class request.

56. The computer-accessible storage medium as recited in claim 55, wherein the program instructions are further computer-executable to implement the delegator class loader traversing the list according to order of deployment of the one or more module class loaders in the class loader chain from a first deployed module class loader to a last deployed module class loader.

57. The computer-accessible storage medium as recited in claim 52, wherein the hierarchy of class loaders is comprised in a virtual machine on the computer system.

58. The computer-accessible storage medium as recited in claim 57, wherein the virtual machine is a platform-independent programming language virtual machine.

59. The computer-accessible storage medium as recited in claim 52, wherein the module is a standalone resource adaptor module of a connector architecture of a programming platform for developing and deploying distributed multitier architecture applications.

60. A distributed computing system, comprising:

an application server comprising a hierarchy of class loaders for loading classes for applications on the application server; and one or more client systems configured to access the applications on the application server;

wherein the hierarchy of class loaders comprises a delegator class loader and a parent class loader of the delegator class loader, wherein the delegator class loader is configured to delegate a load class request from one of one or more child class loaders of the delegator class loader in the hierarchy of class loaders to a module class loader in a class loader chain comprising one or more module class loaders, wherein the parent of each of the one or more module class loaders in the class loader chain is set to the parent class loader of the delegator class loader, and wherein the module class loader is configured to load a class of a module deployed on the application server indicated by the load class request; and wherein the application server is configured to redeploy a different version of the module class loader to the class loader chain, wherein the different version of the module class loader is configured to load a different version of the class for a different version of the module redeployed on the system in response to a subsequent load class request delegated to the different version of the module class loader by the delegator class loader.

* * * * *